US008998224B2

(12) United States Patent
Ngai

(10) Patent No.: US 8,998,224 B2
(45) Date of Patent: Apr. 7, 2015

(54) SCOOTER

(75) Inventor: Chun Kit Ngai, Hong Kong (HK)

(73) Assignee: Rexco Industrial Ltd., Hong Kong (HK)

(*) Notice: Subject to any disclaimer, the term of this patent is extended or adjusted under 35 U.S.C. 154(b) by 162 days.

(21) Appl. No.: 13/615,624

(22) Filed: Sep. 14, 2012

(65) Prior Publication Data

US 2013/0087983 A1   Apr. 11, 2013

Related U.S. Application Data

(60) Provisional application No. 61/543,794, filed on Oct. 5, 2011.

(51) Int. Cl.
| | |
|---|---|
| *B62M 1/00* | (2010.01) |
| *B62K 15/00* | (2006.01) |
| *B60B 19/00* | (2006.01) |
| *B60B 33/00* | (2006.01) |
| *B62K 3/00* | (2006.01) |

(52) U.S. Cl.
CPC ............... *B62K 15/006* (2013.01); *B60B 19/00* (2013.01); *B60B 33/0028* (2013.01); *B62K 3/002* (2013.01)

(58) Field of Classification Search
CPC .... B60B 19/00; B60B 33/0028; B62K 3/003; B62K 15/006; A63C 17/01; A63C 17/011; A63C 17/014; A63C 17/016; A63C 17/033
USPC .......................................... 180/87.01–87.05
See application file for complete search history.

(56) References Cited

U.S. PATENT DOCUMENTS

| | | | | |
|---|---|---|---|---|
| 2,071,080 | A | | 2/1937 | Marshall |
| 2,460,395 | A | * | 2/1949 | Reid ......................... 280/87.041 |
| 3,977,040 | A | | 8/1976 | Sugasawara |
| 4,093,252 | A | * | 6/1978 | Rue .......................... 280/87.042 |
| 4,552,372 | A | * | 11/1985 | Jones ....................... 280/87.041 |
| 4,799,701 | A | * | 1/1989 | Lindau et al. ............ 280/87.041 |
| 5,409,265 | A | * | 4/1995 | Douglass ...................... 280/843 |
| 5,697,627 | A | * | 12/1997 | Schnell ......................... 280/221 |
| 5,826,674 | A | * | 10/1998 | Taylor ........................... 180/219 |
| 5,984,328 | A | * | 11/1999 | Tipton ..................... 280/87.042 |
| 6,142,493 | A | * | 11/2000 | Wang et al. .............. 280/87.041 |
| 6,206,390 | B1 | * | 3/2001 | Borg ........................ 280/87.042 |
| 6,260,866 | B1 | * | 7/2001 | Cheng ........................ 280/87.05 |
| 6,270,095 | B1 | * | 8/2001 | Chang ..................... 280/87.041 |
| 6,276,701 | B1 | * | 8/2001 | Chen ........................ 280/87.05 |
| 6,378,880 | B1 | * | 4/2002 | Lin .............................. 280/87.05 |

(Continued)

FOREIGN PATENT DOCUMENTS

| | | |
|---|---|---|
| DE | 10057951 | 5/2002 |
| DE | 10062017 | 6/2002 |

OTHER PUBLICATIONS

European Search Report of EP12185163.8-1760 / 2578481, Mar. 26, 2013.

*Primary Examiner* — Katy M Ebner

(57) ABSTRACT

A scooter includes a footboard, a steering column having an upper end connected to a handlebar and a lower end connected to a front fork, a head-tube frame assembly having a head tube coupled to the steering column and a frame assembly coupled to the footboard, a front ball bearing wheel rotatably mounted to the front fork, and a rear ball bearing wheel rotatably mounted to a rear fork the footboard. The scooter further includes a folding mechanism in the head-tube frame assembly for folding up the scooter.

13 Claims, 7 Drawing Sheets

(56) References Cited

U.S. PATENT DOCUMENTS

| | | | |
|---|---|---|---|
| 6,511,083 B1 * | 1/2003 | Tsai | 280/87.041 |
| 6,616,163 B2 * | 9/2003 | Lee | 280/245 |
| 7,040,443 B1 * | 5/2006 | Roth et al. | 180/221 |
| 7,083,178 B2 * | 8/2006 | Potter | 280/87.042 |
| 7,226,062 B1 * | 6/2007 | Stefano | 280/87.041 |
| 7,484,742 B2 * | 2/2009 | Choi | 280/87.042 |
| 7,980,568 B2 * | 7/2011 | Chen | 280/11.24 |
| 8,113,524 B2 * | 2/2012 | Karpman | 280/63 |
| 8,464,822 B2 * | 6/2013 | Spector et al. | 180/219 |
| 8,616,313 B2 * | 12/2013 | Simeray et al. | 180/65.51 |
| 2001/0017450 A1 * | 8/2001 | Chuang | 280/87.041 |
| 2002/0093161 A1 * | 7/2002 | Udwin et al. | 280/87.05 |
| 2005/0120514 A1 | 6/2005 | Donakowski | |
| 2006/0103097 A1 * | 5/2006 | Chen | 280/87.05 |
| 2006/0266570 A1 * | 11/2006 | Roth et al. | 180/208 |
| 2010/0117316 A1 * | 5/2010 | Weiner et al. | 280/87.042 |
| 2011/0068554 A1 * | 3/2011 | Armand et al. | 280/253 |
| 2012/0018968 A1 * | 1/2012 | Joslin et al. | 280/87.041 |

* cited by examiner

SCOOTER

CROSS-REFERENCE TO RELATED APPLICATIONS

This application claims priority of U.S. Provisional Patent Application No. 61/543,794 filed on Oct. 5, 2011, the entire content of which is hereby incorporated by reference.

FIELD OF THE TECHNOLOGY

The present application relates to a scooter, and particularly to a scooter having ball bearing wheels.

BACKGROUND

Traditional two-wheeled scooters have front and rear wheels. Each wheel is rotatably mounted on a central wheel axle within a wheel hub. These wheels have been used for many years. It is desirable to produce an improved scooter with wheels that have no central wheel axles and hubs, and to produce a scooter that is simple in construction, low in manufacturing cost and fun to play with.

The above description of the background is provided to aid in understanding a scooter, but is not admitted to describe or constitute pertinent prior art to the scooter disclosed in the present application, or consider any cited documents as material to the patentability of the claims of the present application.

SUMMARY

According to one aspect, there is provided a scooter including a footboard on which a rider can stand, a steering column having an upper end connected to a handlebar and a lower end connected to a front fork; a head-tube frame assembly having a head tube in which the lower end of the steering column is rotatably received and a frame assembly coupled to a front end of the footboard, a front wheel rotatably mounted to the front fork, and a rear wheel rotatably mounted to a rear fork provided at a rear end of the footboard wherein each of the front and rear wheels is in the form of a ball bearing wheel.

Each ball bearing wheel may include an outer ring having an annular raceway formed on an inner surface thereof and an inner ring having an annular raceway formed on an outer surface thereof. The annular raceways are facing each other and defining an annular space. A plurality of bearing balls can be rotatably disposed around the annular space, and a ball-separating ring formed with a plurality of circumferentially spaced apart ball-retaining pockets for retaining therein the plurality of bearing balls respectively.

The front fork may include two downwardly extending prongs, and the lower ends of the two prongs may be connected to two opposite sides of a lowermost portion of the inner ring respectively. According to one embodiment, the front fork can have two downwardly extending prongs, and the lower ends of the two prongs can be connected to two opposite sides of a radially inwardly extended portion formed on a lowermost portion of the inner ring respectively. The front fork may include two semi-circular-shaped prongs extending along two opposite sides of the outer and inner rings of the ball bearing wheel.

In one embodiment, each ball-retaining pocket may be generally Ω-shaped.

In one embodiment, the outer ring may include an outer ground-engaging ring portion and an inner ball-engaging ring portion formed on an inner surface of the outer ground-engaging ring portion. The outer ground-engaging ring portion and the inner ball-engaging ring portion can be molded in one single piece. The outer ground-engaging ring portion may be made of polyurethane. The inner ball-engaging ring portion may be made of acrylonitride butadiene styrene. The inner ring may be made of acrylonitride butadiene styrene.

In one embodiment, the head-tube frame assembly may include two parallel arms having upper ends fixed to the head tube and lower ends pivotally coupled to a pivot pin provided on an upper surface of the footboard at the front end thereof. A tubular casing can be adapted to receive the two arms therethrough and two opposite projections can be formed on two opposite outer walls of the tubular casing respectively. A spring may have an upper end connected to the upper ends of the arms and a lower end connected to a lower end of the tubular casing. Two vertical walls can be formed on an upper surface of the footboard at the front end thereof. The two vertical walls may have two upper curved edges formed thereon with two opposite front slots and two opposite rear slots respectively. The two arms can be moved from an unfolded and locked position where the two opposite projections are inserted and biased by the spring into the two opposite front slots respectively, whereby pulling the tubular casing against the biasing force of the spring releases the two opposite projections from the two opposite front slots and allows the two arms to pivot about the pivot pin from the unfolded position, towards the footboard and to a folded and locked position where the two projections are inserted and biased by the spring into the two opposite rear slots respectively.

According to another aspect, there is provided a scooter including a footboard on which a rider can stand, a steering column having an upper end connected to a handlebar and a lower end connected to a front fork, a head-tube frame assembly having a head tube in which the lower end of the steering column is rotatably received and a frame assembly coupled to a front end of the footboard, a front ball bearing wheel rotatably mounted to the front fork, a rear ball bearing wheel rotatably mounted to a rear fork provided at a rear end of the footboard, two parallel arms having upper ends fixed to the head tube and lower ends pivotally coupled to a pivot pin provided on an upper surface of the footboard at the front end thereof, a tubular casing adapted to receive the two arms therethrough, two opposite projections being formed on two opposite outer walls of the tubular casing respectively, a spring having an upper end connected to the upper ends of the arms and a lower end connected to a lower end of the tubular casing, and two vertical walls formed on an upper surface of the footboard at the front end thereof. The two vertical walls may have two upper curved edges formed thereon with two opposite front slots and two opposite rear slots respectively, whereby the two arms can be moved from an unfolded and locked position where the two opposite projections are inserted and biased by the spring into the two opposite front slots respectively, and whereby pulling the tubular casing against the biasing force of the spring releases the two opposite projections from the two opposite front slots and allows the two arms to pivot about the pivot pin from the unfolded position, towards the footboard and to a folded and locked position where the two projections are inserted and biased by the spring into the two opposite rear slots respectively.

Each of the front and rear ball bearing rings may include an outer ring having an annular raceway formed on an inner surface thereof, and an inner ring having an annular raceway formed on an outer surface thereof. The annular raceways can be facing each other and defining an annular space. A plurality of bearing balls can be rotatably disposed around the annular space, and a ball-separating ring can be formed with a plurality of circumferentially spaced apart ball-retaining pockets for retaining therein the plurality of bearing balls respectively.

In one embodiment, the front fork may include two downwardly extending prongs, and the lower ends of the two prongs can be connected to two opposite sides of a lowermost portion of the inner ring respectively. The front fork may include two semi-circular-shaped prongs extending along two opposite sides of the outer and inner rings of the ball bearing wheel.

In one embodiment, each ball-retaining pocket may be generally Ω-shaped. The outer ring may include an outer ground-engaging ring portion and an inner ball-engaging ring portion formed on an inner surface of the outer ground-engaging ring portion.

Although the scooter disclosed in the present application is shown and described with respect to certain embodiments, it is obvious that equivalents and modifications will occur to others skilled in the art upon the reading and understanding of the specification. The present application includes all such equivalents and modifications, and is limited only by the scope of the claims.

BRIEF DESCRIPTION OF THE DRAWINGS

Specific embodiments of the scooter disclosed in the present application will now be described by way of example with reference to the accompanying drawings wherein:

FIG. 2b is a cross sectional view of an assembled ball bearing wheel of FIG. 2a.

FIG. 2c is another cross sectional view of an assembled ball bearing wheel of FIG. 2a.

FIG. 3b is a side view of the outer ring of FIG. 3a.

FIG. 3c is a cross sectional view of the outer ring of FIG. 3a.

FIG. 4b is a side view of the inner ring of FIG. 4a.

FIG. 4c is a cross sectional view of the inner ring of FIG. 4a.

FIG. 6b is a side view of the annular shield of FIG. 6a.

FIG. 6c is a cross sectional view of the annular shield of FIG. 6a.

FIG. 7b is a side view of the ball-separating ring of FIG. 7a.

FIG. 7c is a cross sectional view of the ball-separating ring of FIG. 7a.

FIG. 8 is a perspective view illustrating the positioning of six bearing balls on the ball-separating ring of FIG. 7a.

DETAILED DESCRIPTION

Figure 1:
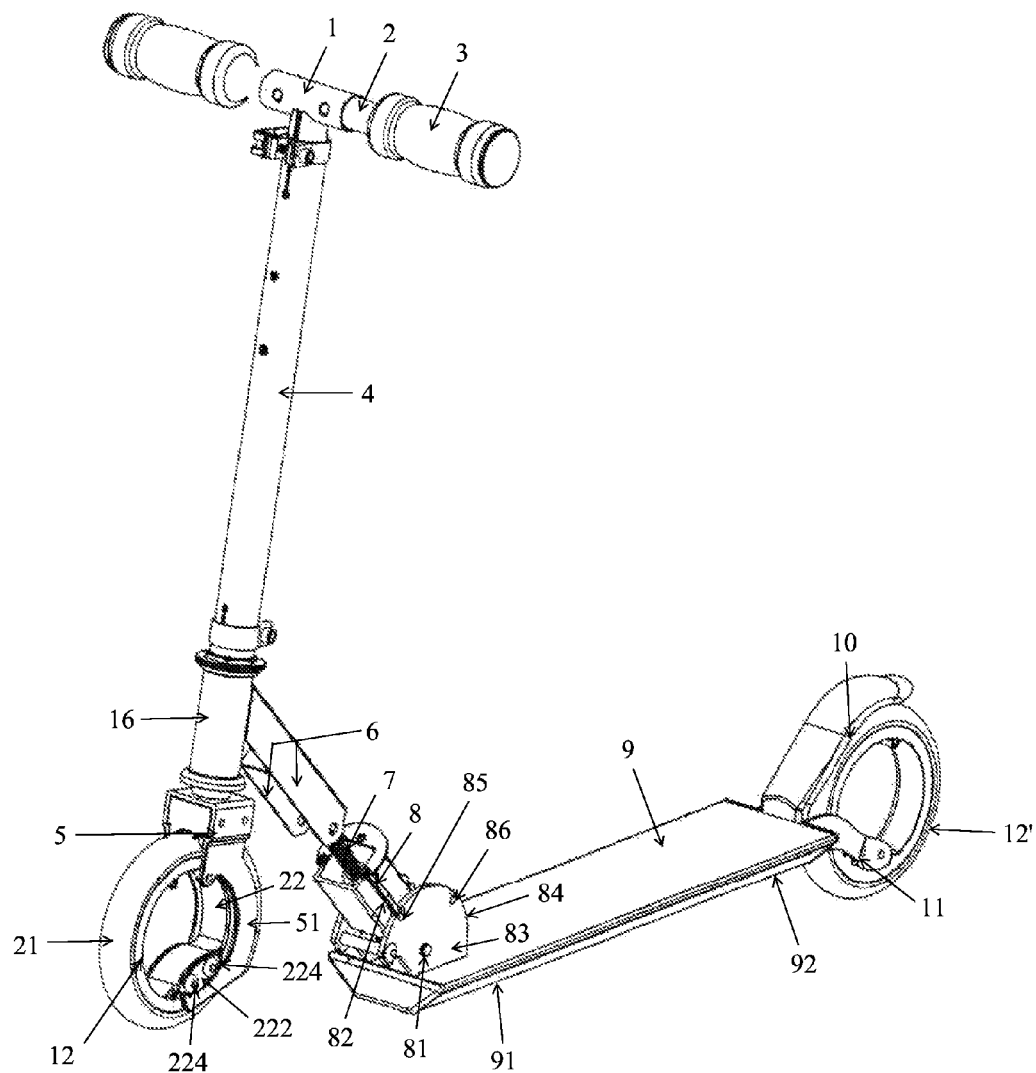
FIG. 1 is a perspective view of a scooter according to an embodiment of the present application.

Reference will now be made in detail to a preferred embodiment of the scooter disclosed in the present application, examples of which are also provided in the following description. Exemplary embodiments of the scooter disclosed in the present application are described in detail, although it will be apparent to those skilled in the relevant art that some features that are not particularly important to an understanding of the scooter may not be shown for the sake of clarity.

Furthermore, it should be understood that the scooter disclosed in the present application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element, or is in mechanical or electrical communication with another element.

Certain terminology is used in the following description for convenience only and is not limiting. The words "front", "rear", "upper", "lower", "upward", and "downward" designate directions in the drawings to which reference is made. The terminology includes the words noted above as well as derivatives thereof and words of similar import.

FIG. 1 is a perspective view of a scooter according to an embodiment of the present application. The scooter may include a platform or footboard 9 on which a rider can stand. The footboard 9 has a front end 91 and a rear end 92. The scooter may include a steering column 4 having an upper end and a lower end.

The upper end of the steering column 4 may be connected to a T-tube 1 having a horizontal tube portion and a downwardly depending portion. A horizontal handlebar 2 can be fixedly received in the horizontal tube portion of the T-tube 1. Two handles 3 can be fixedly coupled to the two opposite ends of the handlebar 2.

The lower end of the steering column 4 can be connected to a front fork 5. A head-tube frame assembly 6, 8, 16 may include a head tube 16 in which the lower end of the steering column 4 can be rotatably received and a frame assembly 6, 8 coupled to the front end 91 of the footboard 9. A front ball bearing wheel 12 can be rotatably mounted to the front fork 5. The front fork 5 may have two downwardly extending prongs 51. The two prongs 51 of the front fork 5 may be generally semi-circular in shape, and extending along two opposite sides of the front ball bearing wheel 12. The two prongs 51 of the front fork 5 can serve as wheel covers for protecting the ball bearing wheel 12 and preventing a rider from accidentally touching the ball bearing wheel 12 during a ride. Furthermore, the two semi-circular prongs 51 can allow a central opening of the ball bearing wheel 12 to remain open without any obstruction.

A rear ball bearing wheel 12' can be rotatably mounted to a rear fork 11 provided at the rear end 92 of the footboard 9.

A cover or fender 10 may be provided at the rear end 92 of the footboard 9. The fender 10 may serve as a cover for the rear ball bearing wheel 12' as well as a braking device of the scooter. The fender 10 can be adapted to make contact with the rear ball bearing wheel 12' when the fender 10 is stepped down by a foot of the rider. When the fender 10 is stepped down and touches the rear ball bearing wheel 12', the friction between the fender 10 and the rear ball bearing wheel 12' causes the scooter to slow down and stop.

Although it has been shown and described that the scooter has two wheels, it is understood that the scooter may have two or more wheels. The detailed structures of the front and rear ball bearing wheels 12, 12' will be described below.

Figure 2A:
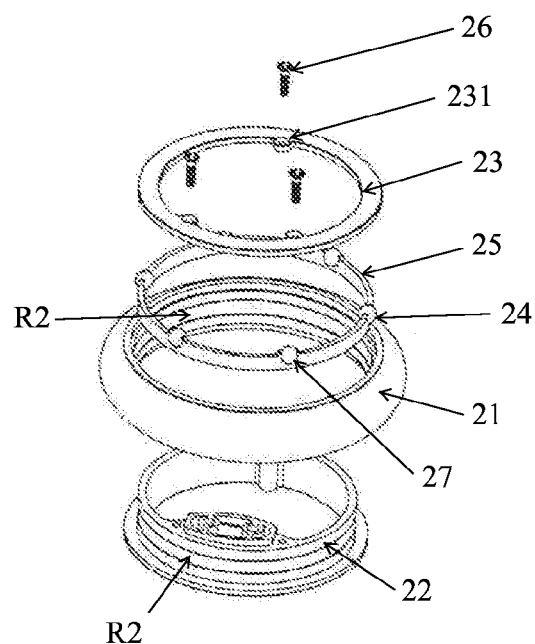
FIG. 2a is an exploded view of a ball bearing wheel according to an embodiment of the present application.
Figure 2B:
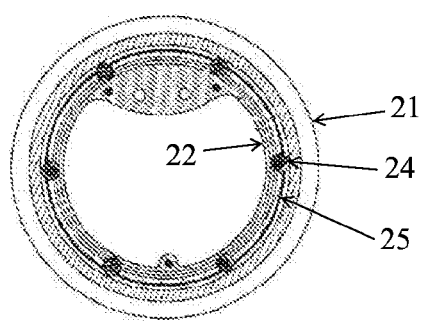
Figure 2C:
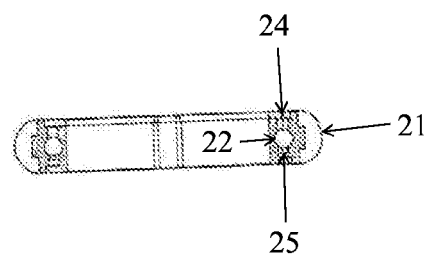

FIGS. 2a, 2b and 2c show different views of the front and rear ball bearing wheels 12, 12' of the scooter according to an embodiment of the present application. The structures of the front and rear ball bearing wheels 12, 12' can be substantially the same.

The ball bearing wheel 12, 12' may include an outer ring 21 having an annular raceway R1 formed on an inner surface thereof, and an inner ring 22 having an annular raceway R2 formed on an outer surface thereof. The annular raceway R2 of the inner ring 22 can be facing the annular raceway R1 of the outer ring 21, and defining an annular space 28 therein-between.

A plurality of bearing balls 24 can be rotatably disposed around the annular space 28. A ball-separating ring 25 may be formed with a plurality of ball-retaining pockets 27 for retaining therein the plurality of bearing balls 24 respectively. The ball-retaining pockets 27 may be equidistantly and circumferentially arranged along the ball-separating ring 25. The plurality of bearing balls 24 may be made of steel or any other suitable material. The two prongs 51 of the front fork 5 may extend along the two opposite sides of the outer and inner rings 21, 22 of the front ball bearing wheel 12.

Figure 3A:
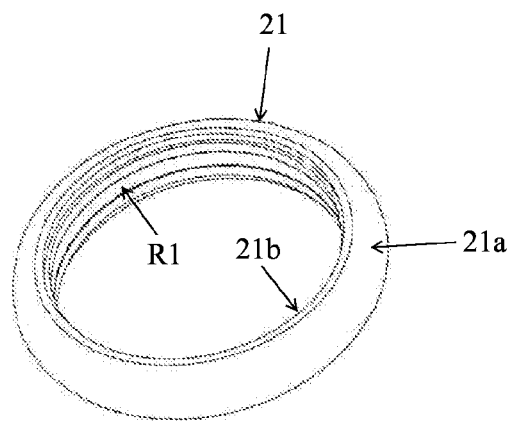
FIG. 3a is a perspective view of an outer ring of the ball bearing wheel according to an embodiment of the present application.
Figure 3B:
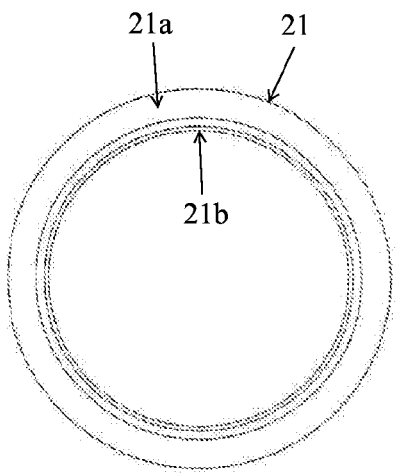
Figure 3C:
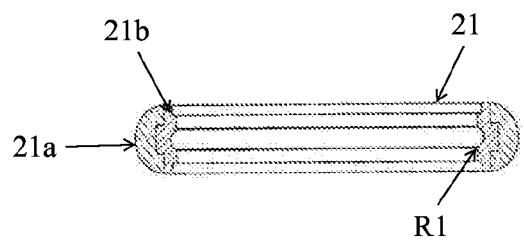

FIGS. 3a, 3b and 3c show different views of the outer ring 21 of the front and rear ball bearing wheels 12, 12' according to an embodiment of the present application.

The outer ring 21 may be formed of an outer ground-engaging ring portion 21a and an inner ball-engaging ring portion 21b. The outer ground-engaging ring portion 21a can have a surface adapted to contact the ground when the scooter is moving thereon. The outer ground-engaging ring portion 21a may be made of polyurethane (PU) or any other suitable elastic material. The inner ball-engaging ring portion 21b is formed with the annular raceway R1 which can be configured to engage with the plurality of bearing balls 24. The inner ball-engaging ring portion 21b may be made of acrylonitride butadiene styrene (ABS) or any other suitable hard material. The outer ground-engaging ring portion 21a and the inner ball-engaging ring portion 21b can be molded in one single piece.

Figure 4A:
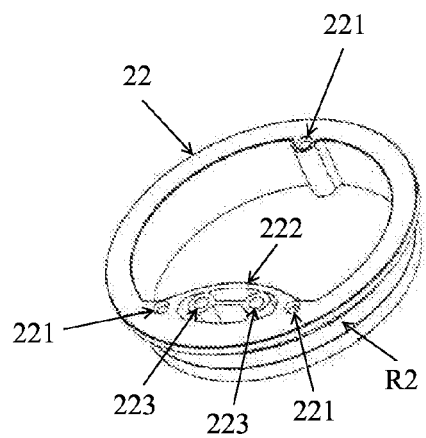
FIG. 4a is a perspective view of an inner ring of the ball bearing wheel according to an embodiment of the present application.
Figure 4B:
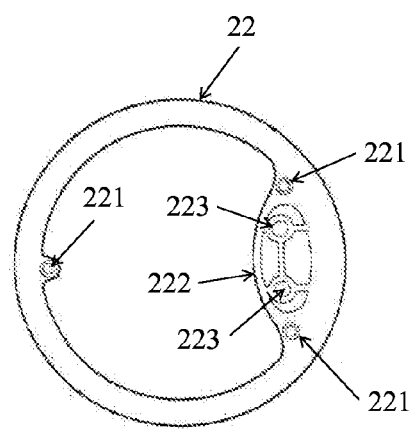
Figure 4C:
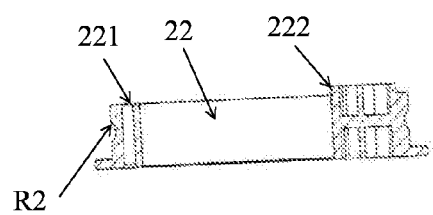

FIGS. 4a, 4b and 4c show different views of the inner ring 22 of the front and rear ball bearing wheels 12, 12' according to an embodiment of the present application.

The inner ring 22 with the annular raceway R2 formed thereon can be configured to engage with the plurality of bearings balls 24. The inner ring 22 may also be made of ABS or any other suitable hard material.

It can be seen in FIG. 1 that the two lower ends of the two prongs 51 of the front fork 5 can be fixedly connected to two opposite sides of a lowermost portion of the inner ring 22 close to the ground respectively. According to the illustrated embodiment, the inner surface of the lowermost portion of the inner ring 22 can be formed with a radially inwardly extended portion 222. The extended portion 222 may be formed with two transverse through holes 223. Two sets of bolts and nuts 224 can be used to fasten the lower ends of the two prongs 51 to the extended portion 222 of the inner ring 22 through the two transverse through holes 223. The connection of the front fork 5 at the lowermost portion of the inner ring 22 close to the ground can make steering of the front ball bearing wheel 12 easier and riding on the scooter steadier.

Figure 5:
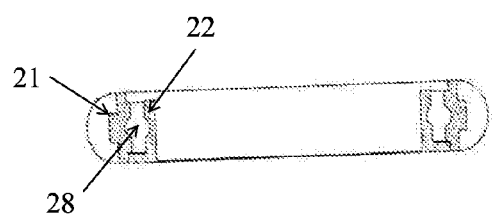
FIG. 5 is a cross sectional view showing the assembled outer and inner rings of the ball bearing wheel.

FIG. 5 illustrates the assembled outer and inner rings 21, 22 of the ball bearing wheels 12, 12'. When the outer and inner rings 21, 22 are assembled together, the annular raceway R2 of the inner ring 22 can be facing the annular raceway R1 of the outer ring 21, and defining the annular space 28 for receiving therein the plurality of bearing balls 24.

Figure 6A:
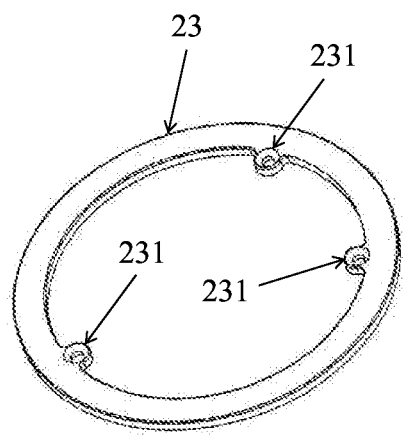
FIG. 6a is a perspective view of an annular shield of the ball bearing wheel according to an embodiment of the present application.
Figure 6B:
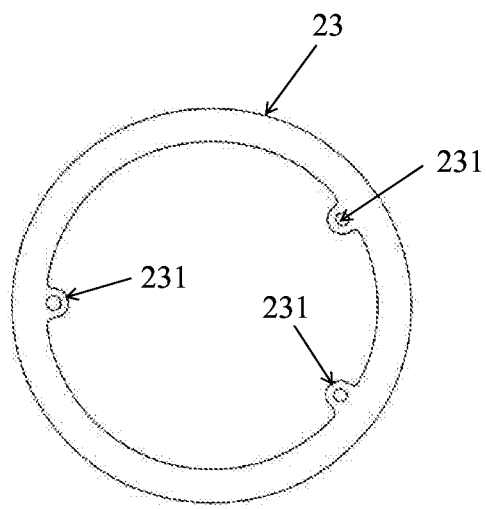
Figure 6C:
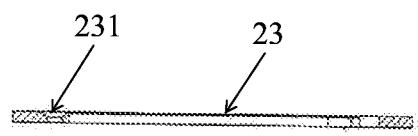

FIGS. 6a, 6b and 6c show different views of an annular shield 23 of the ball bearing wheels 12, 12' according to an embodiment of the present application. The annular shield 23 may have a plurality of screw holes 231 formed thereon. According to the illustrated embodiment, there can be three screw holes 231 formed on the annular shield 23. The annular shield 23 can be fastened on one side of the inner ring 22 by driving screws 26 through the screw holes 231 and into corresponding internally threaded portions 221 of the inner ring 22.

Figure 7A:
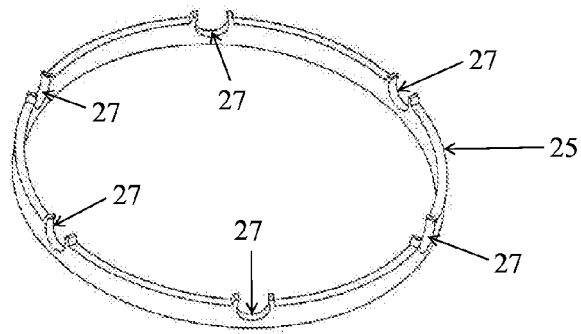
FIG. 7a is a perspective view of a ball-separating ring of the ball bearing wheel according to an embodiment of the present application.
Figure 7B:
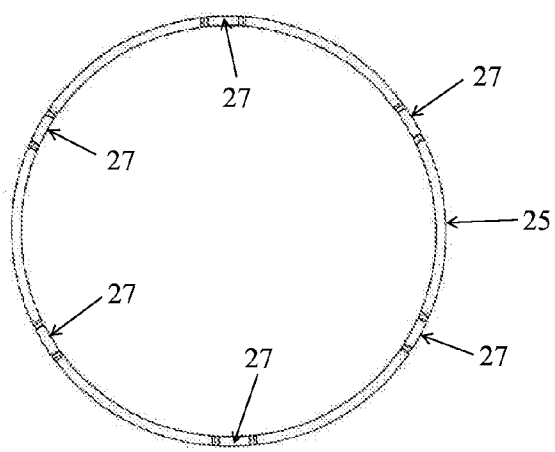
Figure 7C:
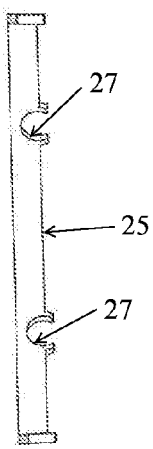

FIGS. 7a, 7b and 7c show different views of the ball-separating ring 25 of the ball bearing wheels 12, 12' according to an embodiment of the present application. The ball-separating ring 25 may be formed with a plurality of circumferentially spaced apart ball-retaining pockets 27 for retaining therein the plurality of bearing balls 24 respectively. According to the illustrated embodiment, there may be six ball-retaining pockets 27 formed on the ball-separating ring 25, though it can have more or less than six ball-retaining pockets 27. Each ball-retaining pocket 27 may have a generally Ω-shape.

Figure 8:
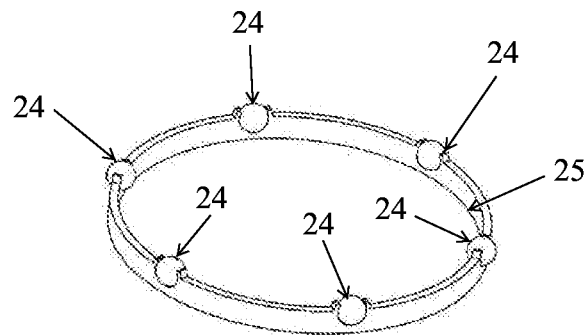

FIG. 8 illustrates the positioning of six bearing balls 24 on the ball-separating ring 25 of FIG. 7a. It can be seen that each bearing ball 24 can be retained in the Ω-shaped ball-retaining pocket 27 formed on the ball-separating frame 25.

Figure 9:
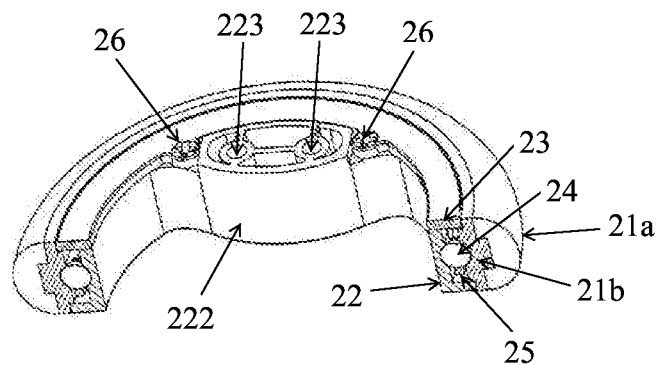
FIG. 9 is a cross sectional view of a fully assembled ball bearing wheel of the present application.

FIG. 9 is a cross sectional view of a fully assembled ball bearing wheel 12, 12'. As best illustrated in this figure, the annular shield 23 can cover one side of the annular space 28 between the outer and inner rings 21, 22 of the ball bearing wheel 12, 12'. By means of the plurality of bearing balls 24, the outer ring 21 can rotate relative to the inner ring 22.

The scooter of the present application may further include a folding mechanism in the head-tube frame assembly 6, 8, 16 for folding up the scooter. According to the illustrated embodiment in FIG. 1, the head-tube frame assembly 6, 8, 16 (partially exploded) may have two parallel arms 6 having two upper ends fixed to the head tube 16 and two lower ends pivotally coupled to a pivot pin 81 provided on an upper surface of the footboard 9 at the front end 91 thereof. The two arms 6 can be received in a tubular casing 8. The tubular casing 8 may have a rectangular cross section. Two opposite projections 82 can be formed on two opposite outer walls of the tubular casing 8 respectively. A spring 7 can an upper end connected to the upper ends of the arms 6, and a lower end connected to a lower end of the tubular casing 8.

Two vertical walls 83 can be formed on an upper surface of the footboard 9 at the front end 91 thereof. The two vertical walls 83 may have two upper curved edges 84 formed thereon with two opposite front slots 85 and two opposite rear slots 86 respectively.

By means of the folding mechanism, the two arms 6 of the head tube 16 can be moved from an unfolded and locked position where the two opposite projections 82 are inserted and biased by the spring 7 into the two opposite front slots 85 of the two vertical walls 83 respectively. Pulling the tubular casing 8 against the biasing force of the spring 7 can release the two opposite projections 82 from the two opposite front slots 85 respectively allowing the two arms 6 to pivot about the pivot pin 81 from the unfolded position towards the footboard 9 to a folded and locked position where the two opposite projections 82 can be inserted and biased by the spring 7 into the two opposite rear slots 86 of the two vertical wall 83 respectively. This folding mechanism serves to fold the steering column 4 together with the handlebar 2, the front fork 5 and the front ball bearing wheel 12 from the unfolded position to a folded position where the steering column 4 is disposed generally parallel to the footboard 9 for easy carrying and storage.

To begin a ride, a rider places one foot on the footboard 9 and uses the other foot to push off the scooter. Since the inner ring 22 is fixedly connected to the steering column 4 and the front fork 5, the inner ring 22 is stationary relative to the steering column 4 and the front fork 5. When the scooter is pushed forwards, the inner ring 22 moves forwards thereby driving the outer ring 21 and the plurality of balls 24 to rotate. When the outer ring 21 rotates, the scooter can then moves forwards.

Without the central wheel axle and wheel hub of a conventional wheel, the scooter with the ball bearing wheels 12, 12' of the present application can have an unconventional outer appearance. Each ball bearing wheel 12, 12' has a central bore defined by the inner ring 22. The front and rear ball bearing wheels 12, 12' of the present application can give a scooter a new and unique look that can make the scooter more fun to play with by kids. Since there are no rotating axle, hub and spokes and less exposing moving parts as in a conventional wheel, the scooter of the present application is safer to play with. Furthermore, the scooter of the present application is simple in construction and low in manufacturing cost.

While the scooter disclosed in the present application has been shown and described with particular references to a number of preferred embodiments thereof, it should be noted that various other changes or modifications may be made without departing from the scope of the appending claims.

What is claimed is:

1. A scooter comprising:
   (a) a footboard on which a rider can stand;
   (b) a steering column having an upper end connected to a handlebar and a lower end connected to a front fork;
   (c) a head-tube frame assembly having a head tube in which the lower end of the steering column is rotatably received, and a frame assembly coupled to a front end of the footboard;
   (d) a front wheel rotatably mounted to the front fork; and
   (e) a rear wheel rotatably mounted to a rear fork provided at a rear end of the footboard;
   (f) wherein each of the front and rear wheels is in the form of a ball bearing wheel;
   wherein each ball bearing wheel comprises:
      an outer ring having an annular raceway formed on an inner surface thereof;
      an inner ring having an annular raceway formed on an outer surface thereof, the annular raceways facing each other and defining an annular space;
      a plurality of bearing balls rotatably disposed around the annular space; and
      a ball-separating ring formed with a plurality of circumferentially spaced apart ball-retaining pockets for retaining therein the plurality of bearing balls respectively; and wherein the outer ring comprises an outer ground-engaging ring portion and an inner ball-engaging ring portion formed on an inner surface of the outer ground-engaging ring portion.

2. The scooter as claimed in claim 1, wherein the front fork comprises two downwardly extending prongs, and the lower ends of the two prongs are connected to two opposite sides of a lowermost portion of the inner ring respectively.

3. The scooter as claimed in claim 1, wherein the front fork comprises two downwardly extending prongs, and the lower ends of the two prongs are connected to two opposite sides of a radially inwardly extended portion formed on a lowermost portion of the inner ring respectively.

4. The scooter as claimed in claim 1, wherein the front fork comprises two semi-circular-shaped prongs extending along two opposite sides of the outer and inner rings of the ball bearing wheel.

5. The scooter as claimed in claim 1, wherein each ball-retaining pocket is generally Ω-shaped.

6. The scooter as claimed in claim 1, wherein the inner ring is made of acrylonitride butadiene styrene.

7. The scooter as claimed in claim 1, wherein the outer ground-engaging ring portion and the inner ball-engaging ring portion are molded in one single piece.

8. The scooter as claimed in claim 1, wherein the outer ground-engaging ring portion is made of polyurethane.

9. The scooter as claimed in claim 1, wherein the inner ball-engaging ring portion is made of acrylonitride butadiene styrene.

10. A scooter comprising:
    (a) a footboard on which a rider can stand;
    (b) a steering column having an upper end connected to a handlebar and a lower end connected to a front fork;
    (c) a head-tube frame assembly having a head tube in which the lower end of the steering column is rotatably received, and a frame assembly coupled to a front end of the footboard;
    (d) a front ball bearing wheel rotatably mounted to the front fork;
    (e) a rear ball bearing wheel rotatably mounted to a rear fork provided at a rear end of the footboard;
    (f) two parallel arms having upper ends fixed to the head tube and lower ends pivotally coupled to a pivot pin provided on an upper surface of the footboard at the front end thereof;
    (g) a tubular casing adapted to receive the two arms therethrough, two opposite projections being formed on two opposite outer walls of the tubular casing respectively;
    (h) a spring having an upper end connected to the upper ends of the arms and a lower end connected to a lower end of the tubular casing; and
    (i) two vertical walls formed on an upper surface of the footboard at the front end thereof, the two vertical walls having two upper curved edges formed thereon with two opposite front slots and two opposite rear slots respectively;
    (j) whereby the two arms can be moved from an unfolded and locked position where the two opposite projections are inserted and biased by the spring into the two opposite front slots respectively, and whereby pulling the tubular casing against the biasing force of the spring releases the two opposite projections from the two opposite front slots and allows the two arms to pivot about the pivot pin from the unfolded position, towards the footboard and to a folded and locked position where the two projections are inserted and biased by the spring into the two opposite rear slots respectively;

wherein each of the front and rear ball bearing rings comprises:
  an outer ring having an annular raceway formed on an inner surface thereof;
  an inner ring having an annular raceway formed on an outer surface thereof, the annular raceways facing each other and defining an annular space;
  a plurality of bearing balls rotatably disposed around the annular space; and
  a ball-separating ring formed with a plurality of circumferentially spaced apart ball-retaining pockets for retaining therein the plurality of bearing balls respectively; and
wherein the outer ring comprises an outer ground-engaging ring portion and an inner ball-engaging ring portion formed on an inner surface of the outer ground-engaging ring portion.

11. The scooter as claimed in claim 10, wherein the front fork comprises two downwardly extending prongs, and the lower ends of the two prongs are connected to two opposite sides of a lowermost portion of the inner ring respectively.

12. The scooter as claimed in claim 10, wherein the front fork comprises two semi-circular-shaped prongs extending along two opposite sides of the outer and inner rings of the ball bearing wheel.

13. The scooter as claimed in claim 10, wherein each ball-retaining pocket is generally Ω-shaped.

* * * * *